United States Patent [19]

McClurg et al.

[11] Patent Number: 5,649,020

[45] Date of Patent: Jul. 15, 1997

[54] ELECTRONIC DRIVER FOR AN ELECTROMAGNETIC RESONANT TRANSDUCER

[75] Inventors: George W. McClurg, Boynton Beach; Gary Lee Pace, Boca Raton; Charles W. Mooney, Lake Worth; John M. McKee, Hillsboro Beach, all of Fla.

[73] Assignee: Motorola, Inc., Schaumburg, Ill.

[21] Appl. No.: 506,304

[22] Filed: Jul. 24, 1995

Related U.S. Application Data

[63] Continuation-in-part of Ser. No. 297,730, Aug. 29, 1994.
[51] Int. Cl.$^6$ .................................................. H04R 25/00
[52] U.S. Cl. ...................... 381/151; 381/152; 381/192; 381/200; 340/311.1; 340/825.46
[58] Field of Search ........................... 381/68, 68.3, 151, 381/152, 192, 193, 194, 199, 200, 203; 340/825.46, 311.1

[56] References Cited

U.S. PATENT DOCUMENTS

| | | |
|---|---|---|
| 3,859,607 | 1/1975 | Brazelton . |
| 4,016,501 | 4/1977 | Jasinski et al. ........................... 330/10 |
| 5,023,504 | 6/1991 | Mooney et al. . |
| 5,107,540 | 4/1992 | Mooney et al. . |
| 5,172,092 | 12/1992 | Nguyen et al. . |
| 5,327,120 | 7/1994 | McKee et al. . |
| 5,436,622 | 7/1995 | Gutman et al. ........................... 340/825.46 |
| 5,524,061 | 6/1996 | Mooney et al. ........................... 381/151 |

Primary Examiner—Curtis Kuntz
Assistant Examiner—Duc Nguyen
Attorney, Agent, or Firm—Philip P. Macnak

[57] ABSTRACT

An electronic driver for use with linear and non-linear transducers includes a voltage controlled oscillator (1630) to generate an output signal (1603) in response to a frequency control signal (1625); a transducer driver (1604), coupled to the voltage controlled oscillator (1630) and to the transducer (600), includes an electromagnetic driver (604) to generate an electromagnetic field in response to the output signal (1603), and a power control circuit (2104, 2106) to suspend generation of the electromagnetic field for a portion of the output signal, the electromagnetic field generating movement of a magnetic motional mass (636) which is transformed into tactile energy; and a tactile energy monitor (1606) coupled to the electromagnetic driver (604) for monitoring a level of tactile energy generated by the movement of the magnetic motional mass (636), and in response thereto generates the frequency control signal (1625) to maximize the level of tactile energy generated.

16 Claims, 11 Drawing Sheets

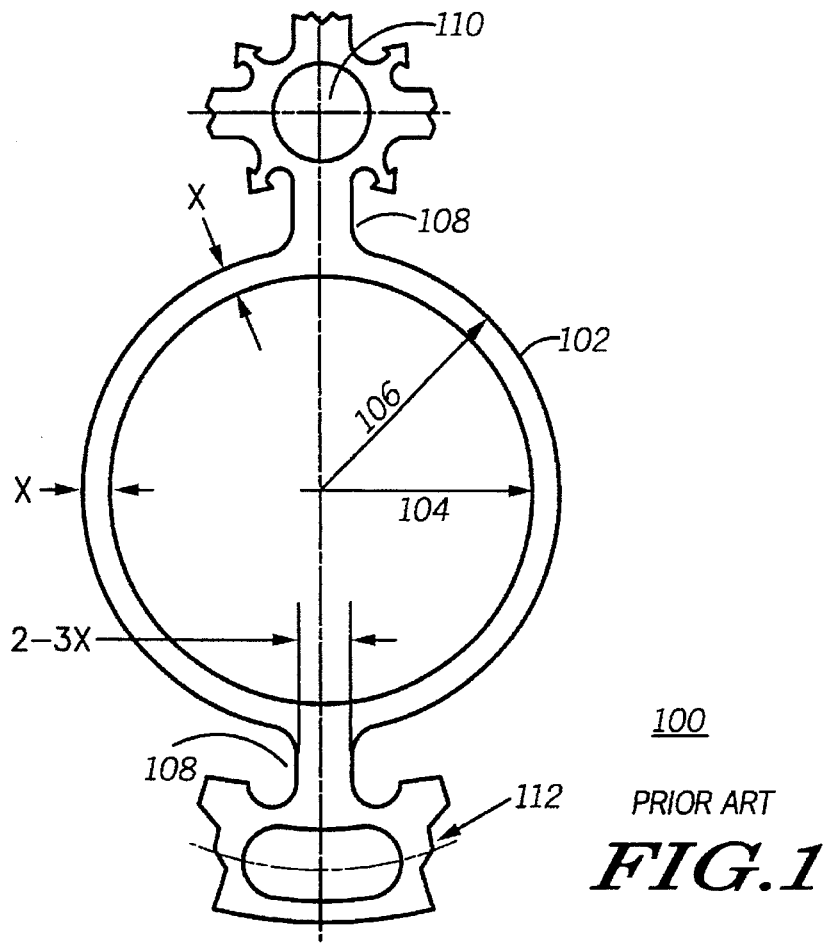
*PRIOR ART*
FIG.1
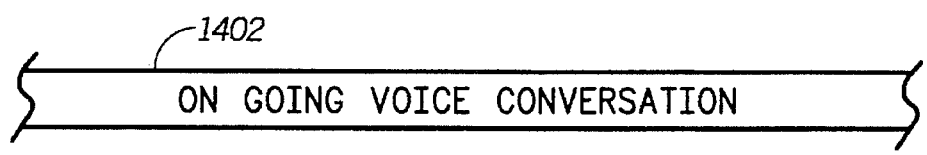
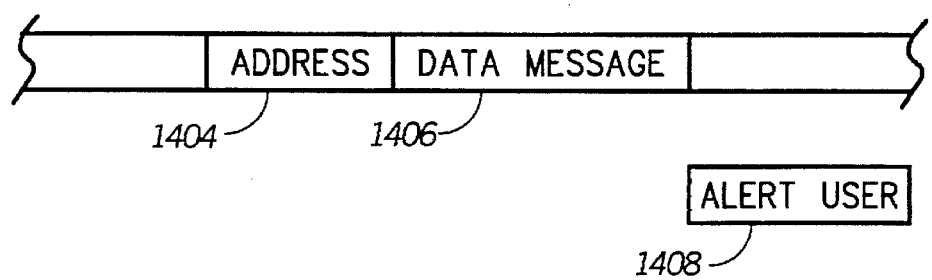
FIG.12

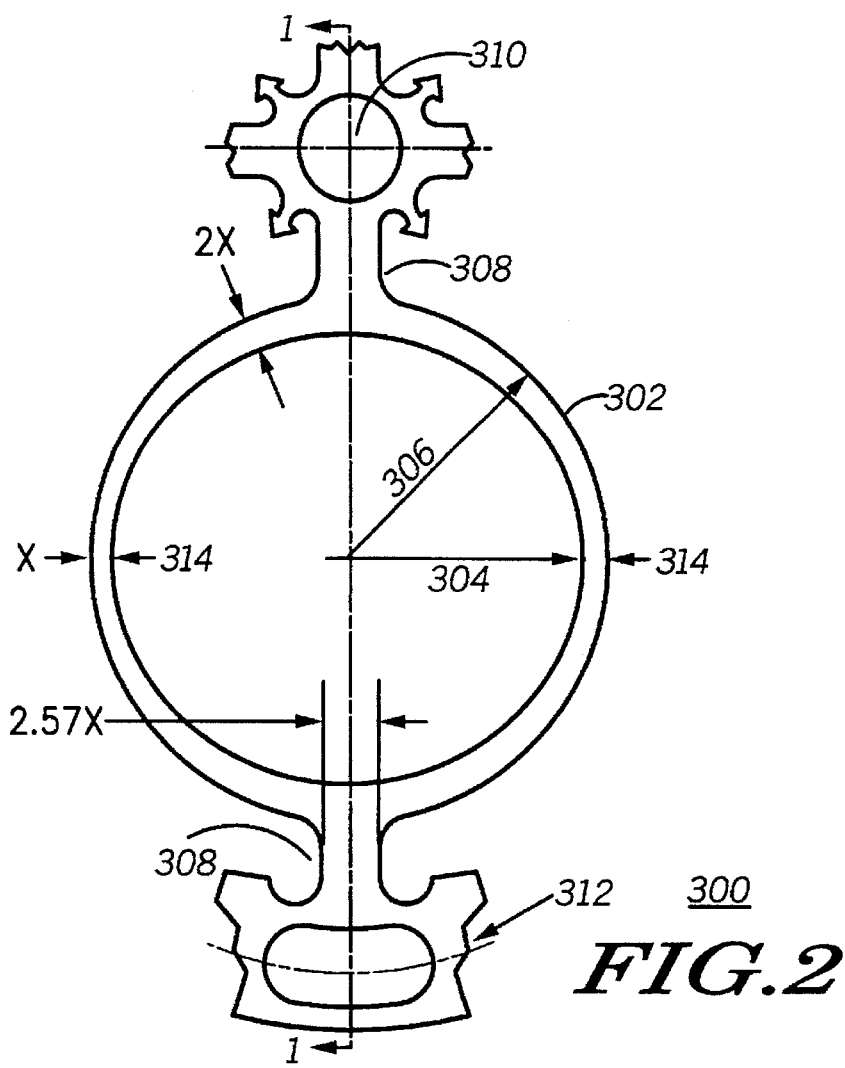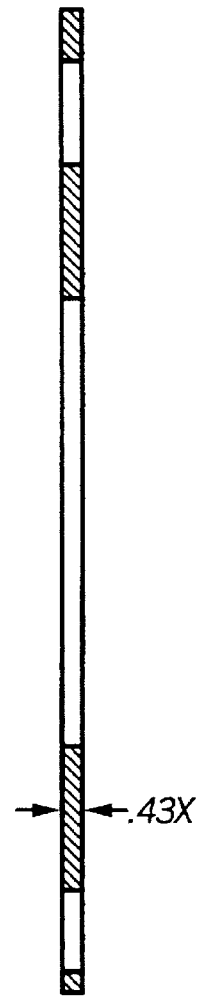
FIG.2
FIG.3

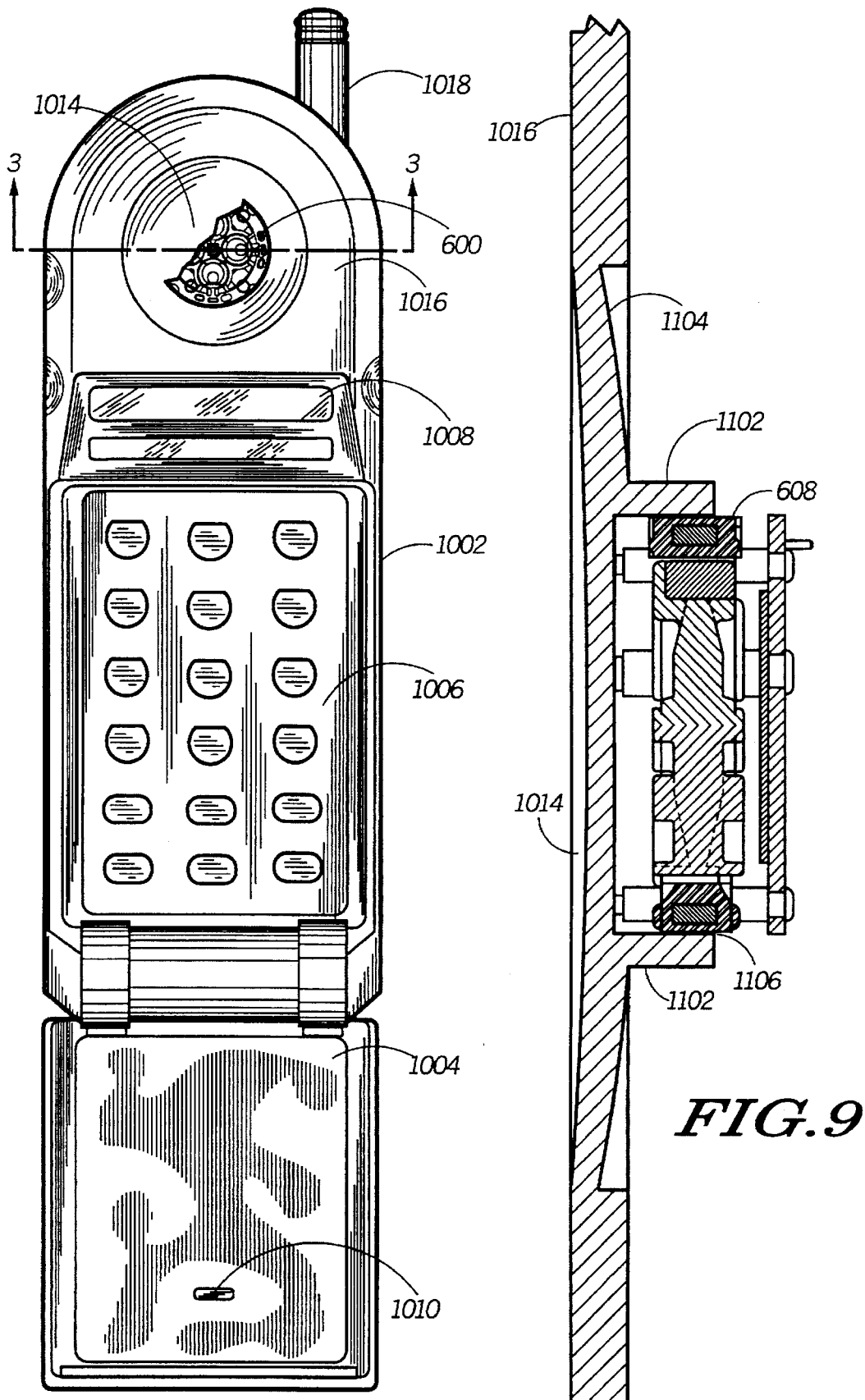

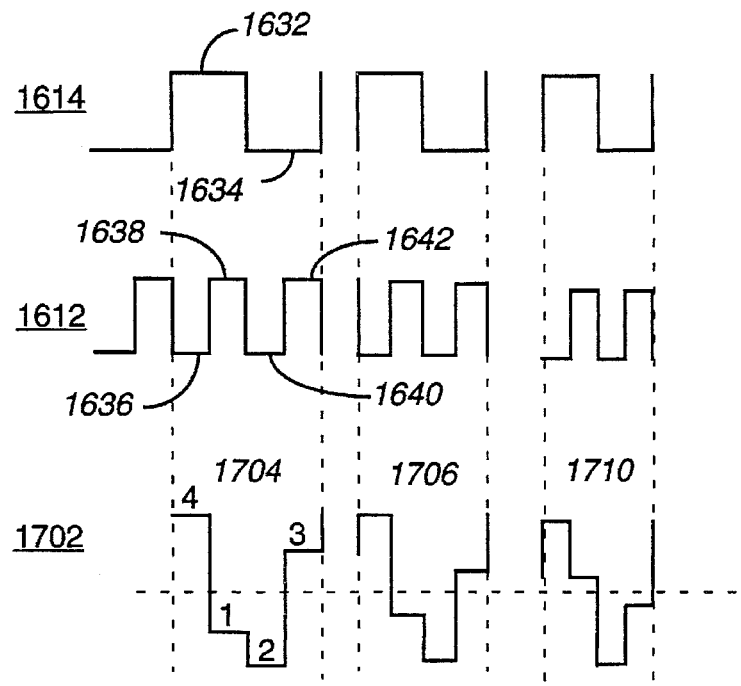
FIG. 17
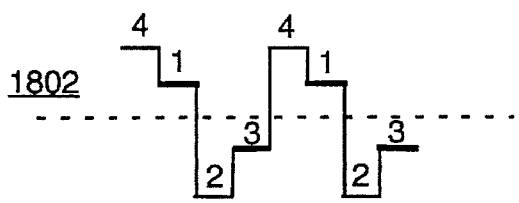
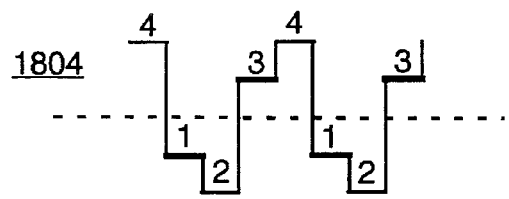
FIG. 18
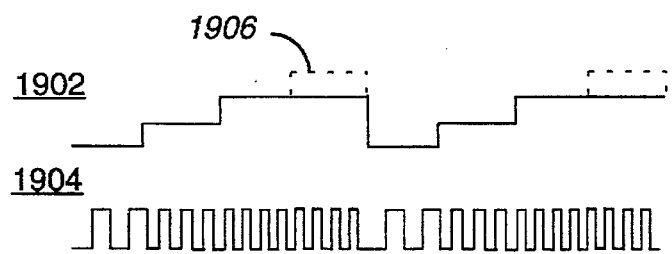
FIG. 19

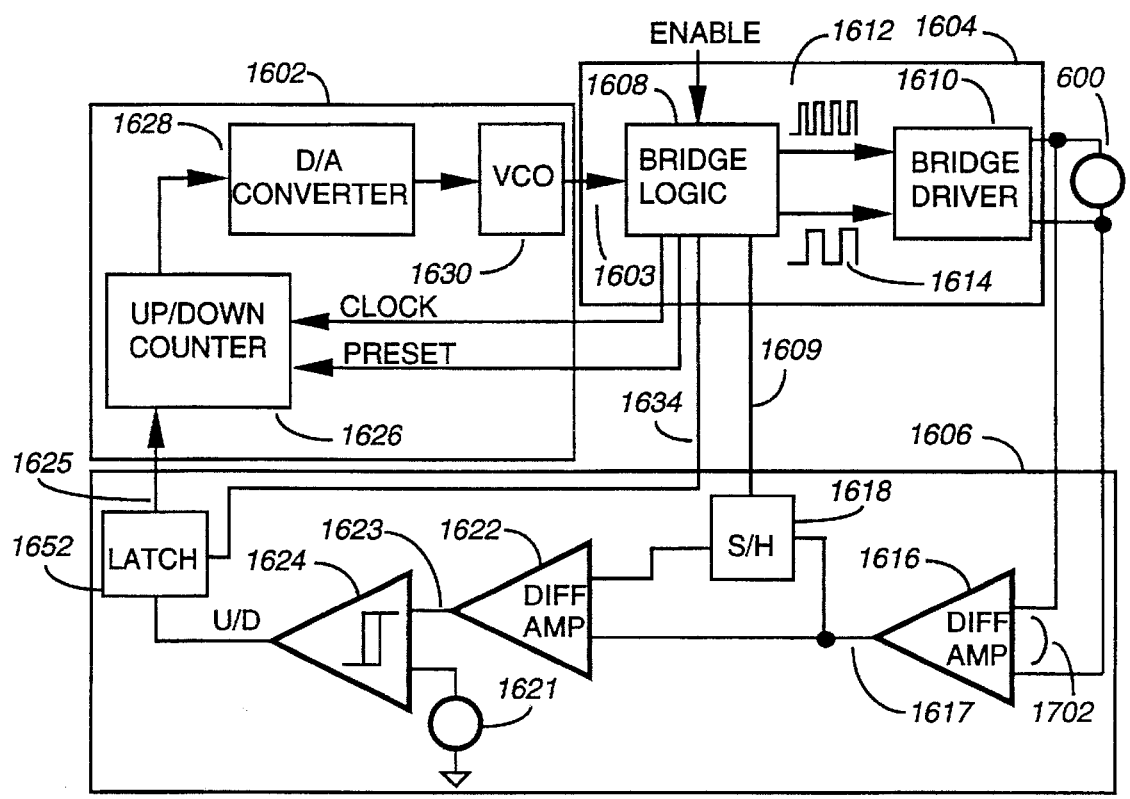
FIG. 20
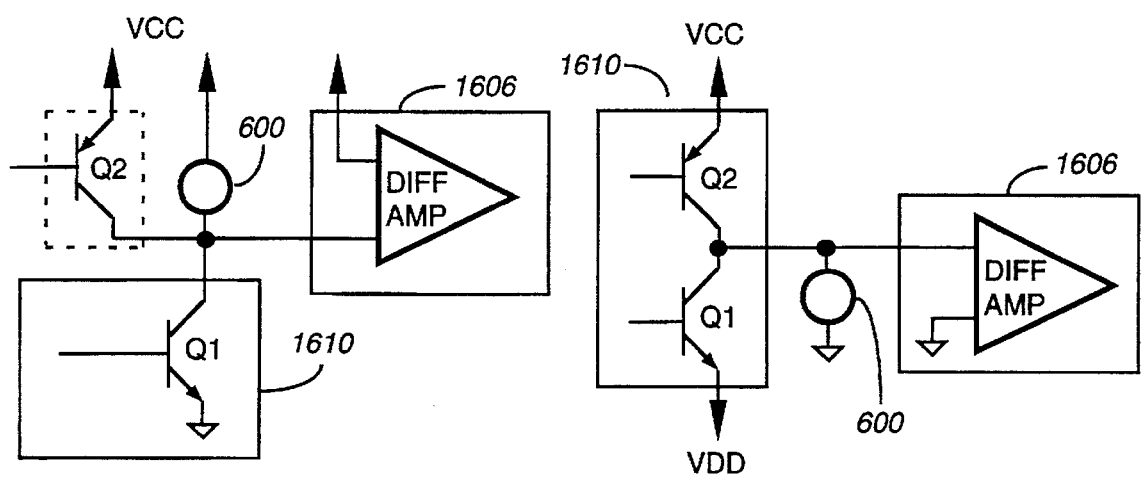
FIG. 22  FIG. 23

ELECTRONIC DRIVER FOR AN ELECTROMAGNETIC RESONANT TRANSDUCER

CROSS REFERENCE TO RELATED APPLICATIONS

This application is a continuation-in-part of U.S. patent application Ser. No. 08/297,730, filed Aug. 29, 1994, by Mooney et al, entitled "Dual Mode Transducer for a Portable Receiver" which is assigned to the assignee hereof.

Related, co-pending applications include patent application Ser. No. 08/297,443, filed concurrently herewith, by McKee, et al., entitled "Mass Excited Acoustic Device" and patent application Ser. No. 08/297,341, filed concurrently herewith, by Hertz, et al., entitled "Inertial Acoustic Pickup", both of which are assigned to the Assignee hereof.

FIELD OF THE INVENTION

This invention relates in general to electronic drivers for electromagnetic resonant transducers, and more specifically to an electronic driver for an electromagnetic resonant transducer utilizing linear resonant spring and non-linear hardening spring resonant armature systems.

BACKGROUND OF THE INVENTION

Portable radiotelephones, such as pocket-sized cellular telephones and second generation (CT2) cordless telephones have become increasingly popular, especially as the size and the cost of such portable radiotelephones has been reduced. Current portable radiotelephones utilize an audible ringing signal to alert the portable radiotelephone user of an incoming call. There are, however, drawbacks to the use of an audible ringing signal. One such drawback is that when the portable radiotelephone is carried in a pocket, the audible ringing signal can become muffled, which can result in the portable radiotelephone user missing a call. Furthermore, there are many areas of public business, such as in theaters and in restaurants, where the use of devices providing an audible ringing signal are being banned, because the audible ringing signal is an annoyance to other customers at the establishment.

Tactile, or silent alerting devices have been utilized for some time in portable communication devices, such as pagers, to provide a vibratory alert signal. The tactile alerting device of choice in prior art portable communication devices has been a motor driven eccentric weight vibrator. While such motor driven eccentric weight vibrators have proved acceptable for use in many portable communication devices, they are generally unacceptable for use in current portable radiotelephones due to the increased space which is required to mount the motors. Also, most portable radiotelephones have only a very limited battery life, and the use of a motor driven eccentric weight vibrator which requires a significant current drain for operation would further reduce the operating time available for such portable radiotelephones.

Various linear resonant spring and non-linear hardening spring resonant armature systems have been described for use as tactile alerting devices, however each of these devices has limitations as to how much tactile energy can be reliably delivered. Because tactile alerting devices based on linear resonant springs are high-Q, the driving frequency must be tightly controlled to insure peak tactile energy output. And because tactile alerting devices based on non-linear hardening spring resonant armature systems have impulse outputs which varying with frequency, there is no repeatable single frequency which will reliably deliver the maximum tactile energy output.

Thus what is needed is an electronic driver for tactile alerting devices using linear resonant spring and non-linear hardening spring resonant armature systems.

SUMMARY OF THE INVENTION

In a first embodiment of the present invention, a tactile alerting system includes a tactile alerting device, a swept frequency signal generator and a tactile alerting device driver. The tactile alerting device comprises a non-linear, hardening spring resonant armature system including a plurality of planar non-linear spring members which are coupled to a magnetic motional mass suspended thereby within an electromagnetic driver for generating an electromagnetic field. The swept frequency signal generator comprises a ramp generator for generating a control voltage which periodically varies in a sequence of steps of increasing amplitude over a predetermined period of time, and a voltage controlled oscillator, coupled to the ramp generator and responsive to the control voltage generated, for generating a swept frequency output signal. The tactile alerting device driver has an input coupled to the swept frequency signal generator and an output coupled to the electromagnetic driver for generating a swept frequency electromagnetic field in response to the swept frequency output signal. The electromagnetic field generates ovement of the magnetic motional mass generated by the swept frequency electromagnetic field is transformed through the plurality of planar non-linear spring members and the electromagnetic driver into tactile energy to generate a tactile alert.

In a second embodiment of the present invention, a tactile alerting system for maximizing tactile energy delivered therefrom includes a tactile alerting device, a variable frequency oscillator, and a tactile alerting device driver. The tactile alerting device comprises a non-linear, hardening spring resonant armature system including a plurality of planar non-linear spring members which are coupled to a magnetic motional mass suspended thereby within an electromagnetic driver to generate an electromagnetic field. The variable frequency oscillator generates an output signal, and has an input responsive to a frequency control signal for controlling a frequency of the output signal. The tactile alerting device driver has an input coupled to the variable frequency oscillator and an output coupled to the electromagnetic driver to generate an electromagnetic field in response to the frequency of the output signal generated. The tactile alerting device driver further includes power control means which suspends generation of the electromagnetic field by the electromagnetic driver during a portion of a first predetermined time interval and during a portion of a second predetermined time interval. The electromagnetic field generates ovement of the magnetic motional mass is generated by the electromagnetic field and is transformed through the plurality of planar non-linear spring members and the electromagnetic driver into tactile energy thereby generating a tactile alert. The tactile energy monitor, is coupled to the electromagnetic driver and monitors a level of tactile energy generated by the movement of the magnetic motional mass during the portion of the first predetermined time interval and during the portion of the second predetermined time interval, and generates in response thereto the frequency control signal to maximize the tactile energy delivered by the tactile alerting device.

BRIEF DESCRIPTION OF THE DRAWINGS

FIG. 1 is a top view of a planar non-linear spring member utilized in an electromagnetic resonant vibrator which can be driven by an electronic driver in accordance with the present invention.

FIG. 2 is a top view of an improved planar non-linear spring member utilized in a dual mode transducer which can be driven by an electronic driver in accordance with the present invention.

FIG. 3 is a cross-sectional view of the improved non-linear spring member taken along line 1—1 of FIG. 2.

FIG. 8 is an orthogonal front view of a personal portable radiotelephone utilizing the dual mode transducer of FIGS. 4 and 5.

FIG. 9 is a cross-sectional view taken along the line 3—3 of FIG. 8 showing the mounting of the dual mode transducer in the portable radiotelephone housing.

FIG. 12 is a signaling diagram in accordance with the present invention

FIG. 17 depicts typical operating wave forms for the electronic driver of FIG. 16 in accordance with the present invention.

FIG. 18 further depicts typical operating wave forms for the electronic driver of FIG. 16 in accordance with the present invention.

FIG. 19 depicts wave forms illustrating operation of the electronic driver of FIG. 16 in accordance with the present invention.

FIG. 20 is an electrical block diagram of an electronic driver for an electromagnetic resonant transducer also in accordance with the second embodiment of the present invention.

FIG. 22 shows a single supply electronic driver in accordance with the present invention.

FIG. 23 shows a dual supply electronic driver in accordance with the present invention.

DESCRIPTION OF THE PREFERRED EMBODIMENT

Figure 4:
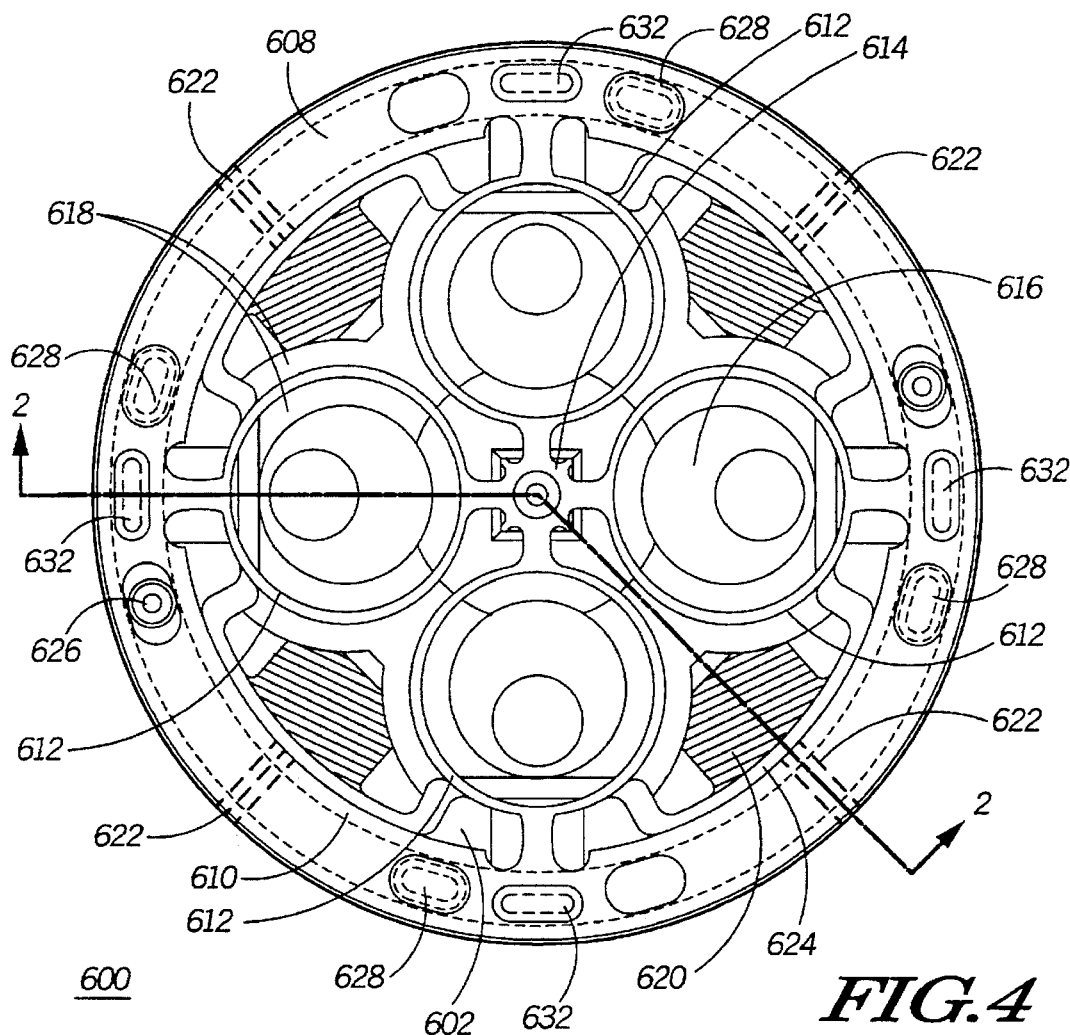
FIG. 4 is a top view of the dual mode transducer which can be driven by an electronic driver in accordance with the present invention.

FIG. 1 shows a top view of a planar non-linear spring member 100 which can be utilized in an electromagnetic resonant vibrator operating as a tactile alerting device when driven by an electronic driver in accordance with the present invention. The planar non-linear spring member 100 has a planar, circular spring member 102 having a circular inner diameter 104 and a circular outer diameter 106, thereby providing a spring member having a substantially uniform width "X". The planar, circular spring member 102 couples through end restraints 108 of substantially uniform width "2-3X" to a central planar region 110 and to a planar perimeter region 112. The relative thickness of the planar spring member is approximately 0.25X the width of the planar, circular spring member 102.

When a tactile alerting device is implemented using an electromagnetic resonant vibrator, such as is described in U.S. Pat. No. 5,107,540 issued Apr. 21, 1992 to Mooney et al, entitled "Electromagnetic Resonant Vibrator", the assignee of which is also the assignee of the present invention, the plurality of planar spring members provide a restoring force which is normal to the motion of the central planar region 110.

FIG. 2 is a top view of an improved planar non-linear spring member 300 which can be utilized in an electromagnetic resonant vibrator operating by way of example as a dual mode transducer to be described below, and which can be driven by an electronic driver in accordance with the present invention. The planar non-linear spring member 300 has a planar, substantially circular spring member 302 having an elliptical inner diameter 304 and a circular outer diameter 306, thereby providing a spring member having a non-uniform width, the width "2X" being the widest in the region contiguous to the end restraints 308, and tapering to a width "X" about the midpoints 314 of the planar, substantially circular spring member 302. The planar, substantially circular spring member 302 couples through end restraints 308 of substantially uniform width "2.57X" to a central planar region 310 and to a planar perimeter region 312.

FIG. 3 is a cross-sectional view taken along line 1—1 of FIG. 2. As shown, the thickness of the improved planar non-linear spring member 300 is by way of example "0.43X" the width of the circular planar spring member 302. It will be appreciated that the overall dimension and thickness of the planar non-linear spring member 300 affects the resonant frequency at which the electromagnetic resonant vibrator resonates.

FIG. 4 is an orthogonal top view of a dual mode transducer 600 (with circuit board 206 removed) which can be operated as an electromagnetic resonant vibrator, and which can be driven by an electronic driver in accordance with the present invention. FIG. 4 shows a coil form 602 which by way of example is approximately 0.7 inch (17.78 mm) in diameter and which encloses an electromagnetic coil 604 (see FIG. 5) which functions as an electromagnetic driver for generating an alternating magnetic field in response to an excitation signal, such as an audio input signal. The coil form 602 is manufactured using conventional double shot injection molding techniques using a plastic material, such as a thirty-percent glass-filled liquid crystal polymer which fully encloses the electromagnetic coil 604 except for terminals 626 which provide electrical connection to the electromagnetic coil 604. It will be appreciated that other plastic materials can be utilized for the coil form 602 as well. The coil form 602 establishes two planar perimeter seating surfaces 630 about a planar perimeter region 608 on which two planar suspension members 610 are supported, and further includes eight contiguously molded bosses 632 which are used to orient and affix the planar suspension members 610 to the coil form 602 using a staking process, such as provided using heat or ultrasonics.

Each of the two planar suspension members 610 comprises four independent planar non-linear spring members 612 arranged regularly around a central planar region 614 which is used for positioning and fastening a moveable mass 616 to the two planar suspension members 610 also using a staking process. The independent planar non-linear spring members 612 are defined as having a circular outer perimeter and an elliptical inner perimeter such as described in FIG. 4 above. The planar suspension members 610 are manufactured from a sheet metal, such as Sandvik™ 7C27M02 stainless martensitic chromium steel alloyed with molybdenum, or a 17-7 PH heat treated CH900 precipitation-hardened stainless steel. It will be appreciated that other materials can be utilized as well. The sheet metal thickness is preferably 0.002 inch (0.0508 mm) thick, and the planar suspension members are formed preferably by chemical etching, or machining technique. The movable mass 616 is manufactured using conventional die casting techniques using a "Zamak 3" zinc die-cast alloy, although it will be appreciated that other materials can be utilized as well.

The arrangement of the elements of the dual mode transducer 600 is such that the movable mass 616 can be displaced upwards and downwards in a direction normal to the planes of the two planar suspension members 610, the displacement being restricted by a restoring force provided by the independent planar non-linear spring members 612 in response to the displacement. The movable mass 616 is formed such that there are shaped channels 618 for allowing the movable mass 616 to extend through and around the independent planar non-linear spring members 612 during excursions of the movable mass 616, thereby providing a greater mass to volume ratio for the dual mode transducer 600 than would be possible without the shaped channels 618. A driving force for the movable mass 616 is produced by four radially polarized permanent magnets 620 attached to the movable mass 616 and magnetically coupled to the electromagnetic coil 604. The permanent magnets 620 are manufactured using Samarium Cobalt having a Maximum Energy Product of 28–33 and are magnetized to produce a coercive force of 8K–11K Oersteds. The two planar suspension members 610, the movable mass 616, and the four permanent magnets 620 comprise a resonant armature system for the dual mode transducer 600.

An additional detail shown in FIG. 4 comprises four radial projections 622 projecting in a direction normal to each surface (top and bottom) of the coil form 602 for compressively engaging with the planar perimeter region 608 of the planar suspension members 610. The radial projections 622 preload the planar perimeter region 608 after the planar suspension members 610 are attached to the surface of the coil form 602 using bosses 632 located on either side of each of the radial projections 622. The bosses 632 are staked using heat or ultrasonics to secure the planar suspension members 610 to the planar perimeter region 608 of the coil form 602. The purpose of pre-loading is for preventing audible (high frequency) parasitic vibrations during operation of the dual mode transducer 600.

Figure 5:
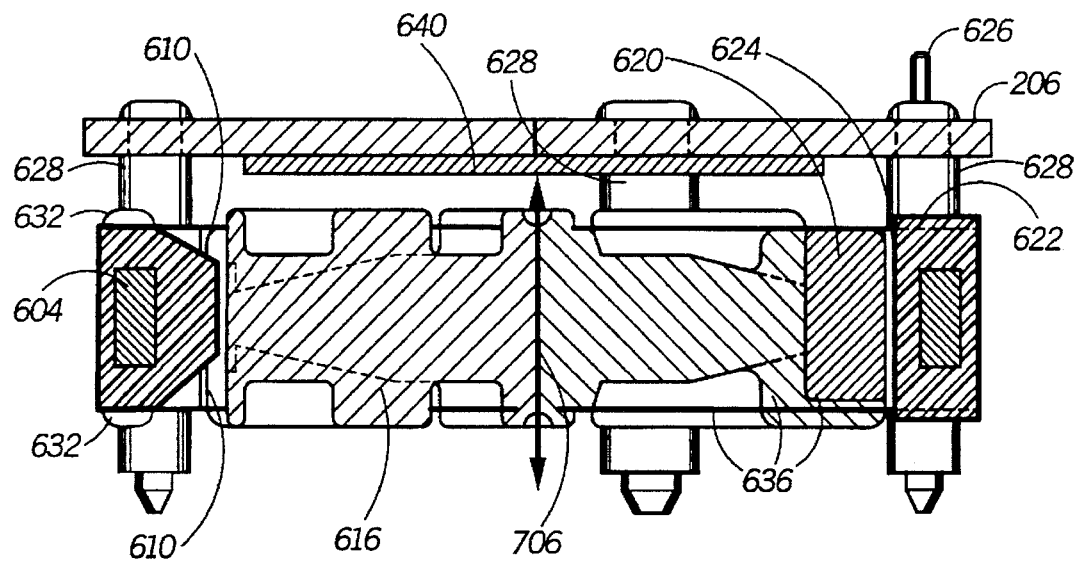
FIG. 5 is a cross-sectional view of the dual mode transducer taken along the line 2—2 of FIG. 4.

With reference to FIG. 5, a cross-sectional view taken along the line 2—2 of FIG. 4 of the dual mode transducer 600 clearly shows an air gap 624. The air gap 624 surrounds the movable mass 616 (partially shown), thus allowing the movable mass 616 to move in a direction normal to the planes of the two planar suspension members 610. During operation, the electromagnetic coil 604 generates an alternating magnetic field polarized in a direction parallel to an axis 706 through the center of the magnetic motional mass 636 which comprises the movable mass 616, permanent magnets 620 and the planar suspension members 610, at a frequency substantially the same as the fundamental resonant frequency of the magnetic motional mass 636. The alternating magnetic field is generated when a drive signal is coupled to the electromagnetic coil 604, the drive signal being preferably a swept low frequency drive signal to produce a tactile alert, or an audible drive signal to produce an audible response. The alternating magnetic field generated is magnetically coupled to the four permanent magnets 620 that are electromagnetically coupled to the movable mass 616. The magnetic coupling produces an alternating excitation force on the resonant armature system 636, and causes the magnetic motional mass 636 to vibrate with a displacement direction parallel to the axis 706 when the swept low frequency drive signal or the audible drive signal is provided. When the dual mode transducer 600 is installed in a device, e.g., a personal portable radiotelephone, such that the dual mode transducer 600 is oriented with the axis 706 normal to a user's body, a strong tactile response is advantageously generated with less power input to the dual mode transducer 600 than would be required by conventional vibrators. This increase in efficiency is obtained because the dual mode transducer 600 in accordance with the present invention overcomes many power wasting characteristics associated with earlier vibrator designs.

While the preferred embodiment according to the present invention uses the electromagnetic coil 604 interacting with the permanent magnets 620 for generating the alternating excitation force, other means, e.g., piezoelectric means, can be used as well for generating the alternating excitation force.

Figure 6:
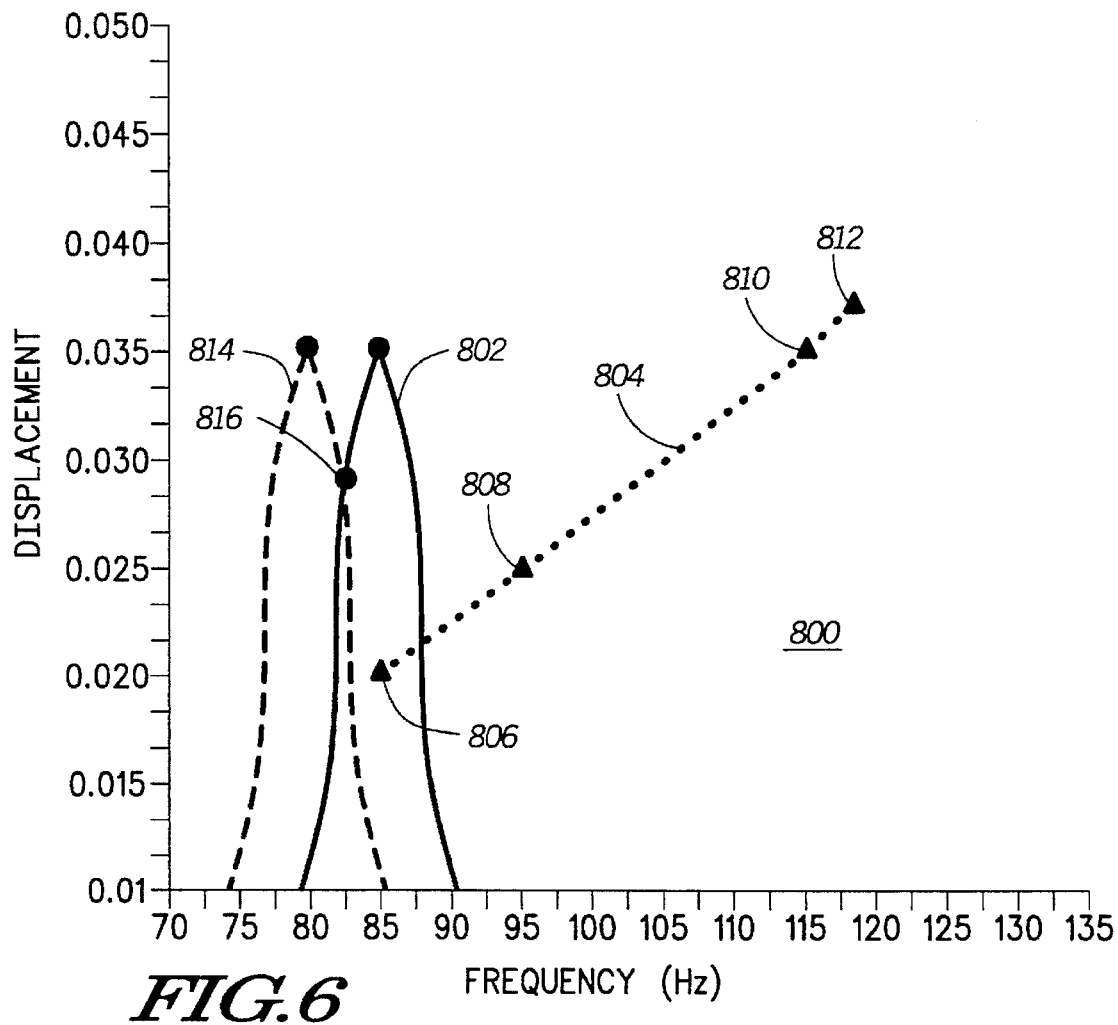
FIG. 6 is a graph comparing the amplitude versus fundamental frequency response of a linear resonant vibrator system and the dual mode transducer.

FIG. 6 is a graph 800 comparing the displacement versus fundamental frequency response of the dual mode transducer 600 operating as an electromagnetic resonant vibrator and an equivalent linear resonant vibrator. A linear resonant vibrator comprises a cantilever spring member which is coupled to a magnetic motional mass and which is suspended within an electromagnetic driver.

A frequency response curve 802 is shown for the linear resonant vibrator which is driven, for example, with an excitation voltage of 0.9 volts, and which in response thereto produces a peak displacement of 0.035 inches (0.89 mm) at a center driving frequency of 85 Hz and corresponds to an impulse output of 27g's which is calculated from the following formula:

$$g's = 0.10225(d)(f)^2$$

where g is the impulse output generated by the system, d is the displacement of the vibrating mass, and f is the driving frequency.

As shown by the frequency response curve 802, the linear resonant vibrator is high-Q, and the impulse output falls off rapidly on either side of the peak center frequency. Thus the displacement of the magnetic motional mass is maximized at a predetermined resonant frequency, and great care must be taken to insure the driving frequency is controlled to match the peak center frequency to maximize the impulse output. Any variation in driving frequency, and more particularly, in the response of the linear resonant vibrator due to manufacturing tolerances can result in a significant reduction in the impulse output generated.

As also shown in FIG. 6, the impulse output of the linear resonant vibrator is not stable, but can shift in frequency in response to changes in the inertia of the mounting system as shown by the frequency response curve 814. The frequency response curve 802 depicts the frequency response of a linear resonant vibrator which is in one instance constrained, such as when a device housing a vibrator is attached to a person's belt, while the frequency response curve 814 depicts the frequency response of the linear resonant vibrator which in a second instance is essentially unconstrained, such as when the device housing the vibrator is set on a table such that the motion along the axis 706 of the vibrator is parallel to the surface of the table. As can be seen, a significant reduction in the tactile output can occur if the tactile alerting frequency is not properly selected, and as a compromise, the operating frequency of such linear resonant vibrators are set at an intermediate frequency 816, thereby maximizing both constrained and non-constrained operation.

In summary, the mounting system has a first inertia when mounted in a first position and a second inertia different than the first inertia when mounted in a second position, and the predetermined resonant frequency of the cantilever spring member shifts from a first frequency in the first position to a second frequency different than the first frequency in the second position, as described above.

In contrast, the dual mode transducer 600 in accordance with the preferred embodiment of the present invention is a hardening spring type resonant system which can provide a significant impulse output over a very broad range 804 of driving frequencies. Impulse outputs are tabulated below for the hardening spring type resonant system, when also driven as described above with the same excitation voltage of 0.9 volts as compared to the linear resonant vibrator system:

| Ref. | Impulse (g's) | Displacement (in./mm) | Driving Frequency (Hz) |
|---|---|---|---|
| 806 | 12 | 0.020/.51 | 85 |
| 808 | 24 | 0.025/.64 | 95 |
| 810 | 45 | 0.035/.89 | 115 |

Above point 812, the impulse output of the dual mode transducer falls off rapidly, as will be described below. As can be seen from the table above, a significantly higher impulse response can be achieved as compared to the linear resonant vibrator system without the restrictions on controlling the center driving frequency.

Figure 7:
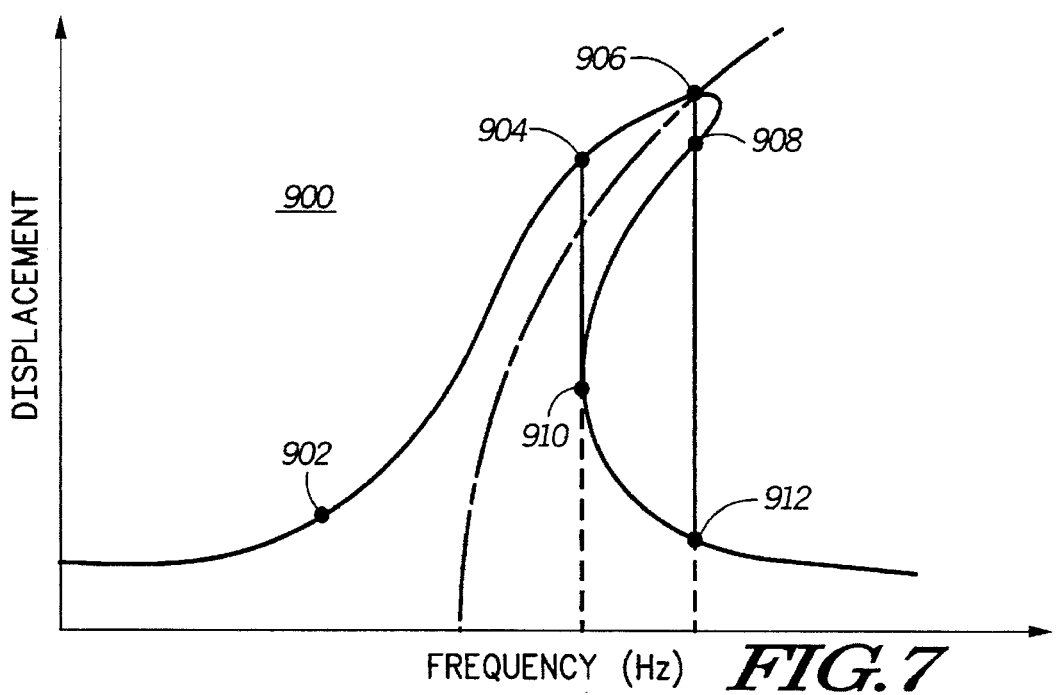
FIG. 7 is a graph depicting the impulse output as a function of frequency for a dual mode transducer utilizing a hardening spring resonant armature system.

FIG. 7 is a graph depicting the impulse output as a function of frequency for a dual mode transducer utilizing a non-linear, hardening spring resonant armature system driven by an electronic driver in accordance with the present invention. Unlike a linear resonant vibrator system which requires a carefully controlled driving frequency to insure maximum impulse output, the dual mode transducer utilizing a non-linear, hardening spring resonant armature system is preferably driven by a swept driving frequency, operating between a first driving frequency to provide a lower operating state 902 and a second driving frequency to provide an upper operating state 904. The upper operating state 904 is preferably selected to correspond substantially to the maximum driving frequency at which there is only a single stable operating state. As can be seen from FIG. 7, two stable operating states 904 and 910 are possible when the driving frequency is set to that required to obtain the operating state 910, and as the driving frequency is increased therefrom, three operating states can exist, such as shown by example as operating state 906, 908 and 912, of which only operating state 912 is stable. It will be appreciated, that only those impulse responses which lie on the curve 900 between lower operating state 902 and upper operating state 904 are desirable when utilizing the dual mode transducer 600 as a tactile alerting device because the impulse output is reliably maximized over that frequency range. As will be described below, those impulse responses which lie on the curve 900 above the operating state 912 are suitable for providing audible responses.

FIG. 8 is an orthogonal front view of a personal portable radiotelephone 1000 which advantageously utilizes the dual mode transducer 600 shown in FIGS. 4 and 5. The personal portable radiotelephone 1000, such as a Silverlink 2000™ Personal Telephone manufactured by Motorola Inc., of Schaumburg, Ill, includes a housing 1002 for enclosing transceiver circuits utilized to provide two-way radio frequency communication with other personal portable radiotelephones or to a telephone coupled to a conventional telephone network. A keypad 1006, coupled to the housing 1002, allows the user to enter information, such as a telephone number or a password, and a display 1008 is provided to display the telephone number entered to be dialed or the password. A microphone 1010 is located within a hinged housing member 1004, and the dual mode transducer 600 is mounted to the upper portion 1016 of the housing 1002. The housing portion identified as 1014 functions as a soundboard, as will be described below, and has been cutaway in part to reveal the dual mode transducer 600. The dual mode transducer 600 functions in one mode as a tactile alerting device, and in a second mode as an audio range transducer. Transmission and reception of the two way radio communication signals is provided by an antenna 1018.

FIG. 9 is a cross-sectional view taken along the line 3—3 of FIG. 8 showing the mounting of the dual mode transducer 600 in the housing 1002. The sound board 1014 is integrally molded as a part of the upper portion 1016 of the housing 1002 using conventional injection molding techniques and thermoset plastic materials. A ring 1102 having a substantially circular periphery is formed contiguously with the back of the sound board 1014, and is used to mount the dual mode transducer 600, as shown. The dual mode transducer 600 is attached at the perimeter 1106 of the coil form 608 to the ring 1102 and is preferably held in place using an adhesive, such as a cyanoacrylate or epoxy adhesive. The front surface of the sound board 1014 has a preferably concave profile to identify the position of the dual mode transducer 600, as there are no sound porting holes, as is required with a conventional acoustic transducer, such as an electromagnetic speaker. The sound board 1014 has a generally uniform thickness which tapers to a reduced thickness at the periphery 1104 which contributes to the compliance of the sound board 1014, thereby establishing the resonance of the sound board 1014. When the magnetic motional mass is set into movement, the movement of the magnetic motional mass is transformed into tactile or acoustic energy through the planar non-linear spring members which couple to the electromagnetic driver, and which further in turn couples to the sound board 1014 through the ring 1102. The sound board 1014 functions as an earpiece for the transmission of the tactile or acoustic energy to the user. The acoustic energy is delivered primarily by means of bone conduction when the housing is placed in contact with the user's ear, as will be described in further detail below.

Figure 10:
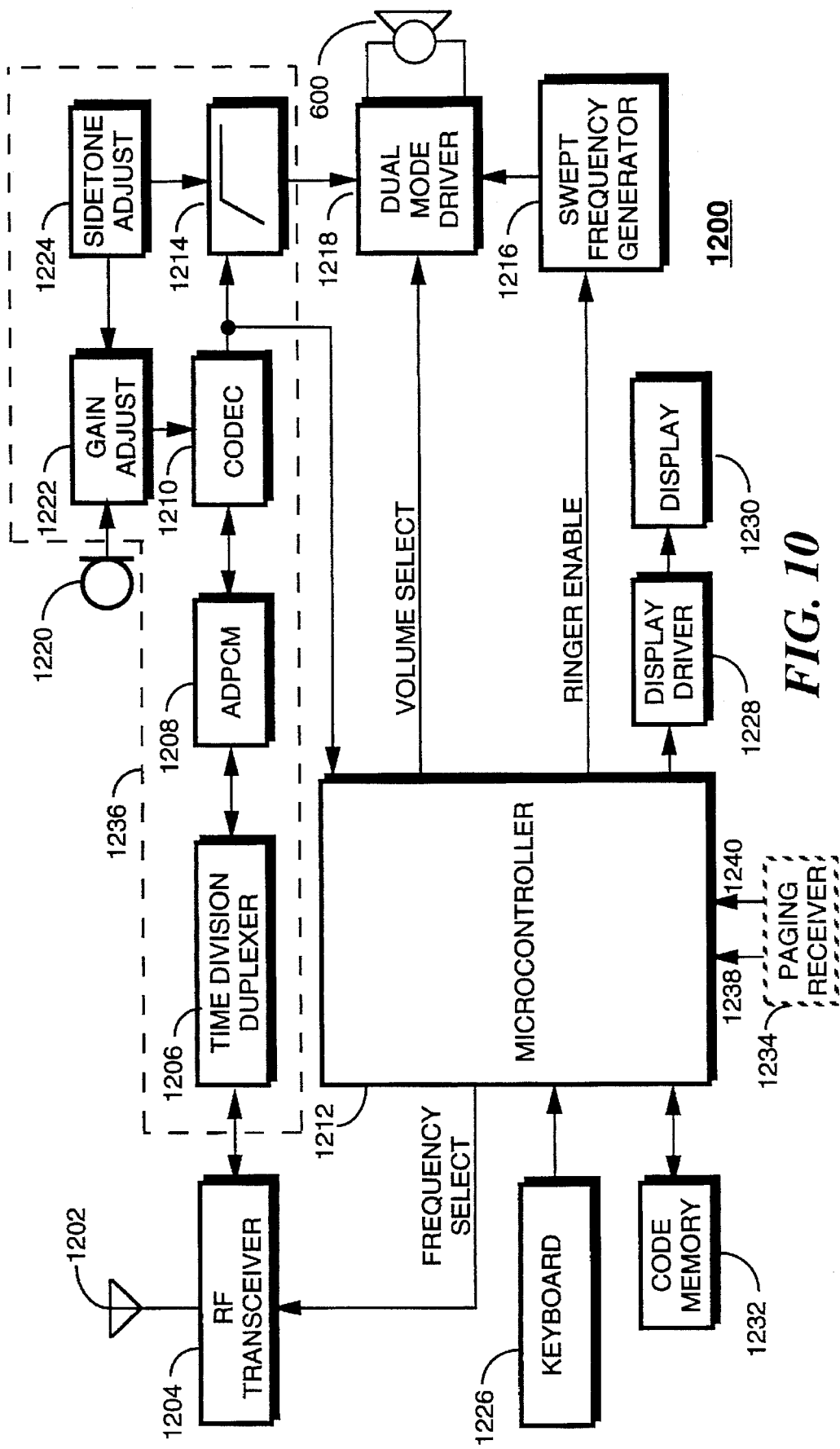
FIG. 10 is an electrical block diagram of the portable radiotelephone of FIG. 8 utilizing the dual mode transducer which can be driven by an electronic driver in accordance with the present invention.

FIG. 10 is an electrical block diagram of the portable radiotelephone 1000 shown in FIG. 8 which utilizes the dual mode transducer 600. Audio messages are transmitted over a radio frequency channel and received using a well known signaling protocol, such as the CT2 (Second Generation Cordless) Common Air Interface protocol in which audio signals are processed using adaptive differential pulse code modulation techniques and transmitted in a time division duplex manner. As shown in FIG. 10, transmitted audio message signals are intercepted by antenna 1202 and processed by radio frequency transceiver 1204 to provide a recovered audio message signal having time division duplexed information. A processing means 1236 comprising a time division duplexer 1206, an adaptive differential pulse code modulator/demodulator 1208 and a codec 1210 process the detected voice message signals, as will be described below. The time division duplexed audio message signals are processed by a time division duplexer 1206 which recovers the received channel information in the form of a 4-bit adaptive differential pulse modulated signal which is processed by the adaptive differential pulse code modulator/demodulator 1208 to produce an 8-bit pulse code modulated output. The 8-bit pulse code modulated signal is coupled to the input of a codec 1210 which converts the pulse code modulated signal into an analog signal representative of an audio ringer signal followed by the original audible voice message. The audio ringer signal is coupled to and detected by a ring detector circuit which is a function performed within the microcontroller 1212. When the audio ringer signal is detected, a ringer enable signal is generated by the microcontroller 1212 which is coupled to a swept frequency signal generator 1216 which generates a swept sub-audible frequency signal. The swept sub-audible frequency signal is preferably swept repeatedly over a predetermined time interval, such as at 550 millisecond time intervals during the time in which the audio ringer signal is received. The frequency range of the swept sub-audible frequency signal is a function of the dual mode transducer design, and covers frequency ranges between 70–110 Hz to 105–190 Hz, between 80 Hz and 110 Hz being typical. The frequency ranges are selected which provide the highest susceptibility to tactile stimulation to the device user.

Figure 11:
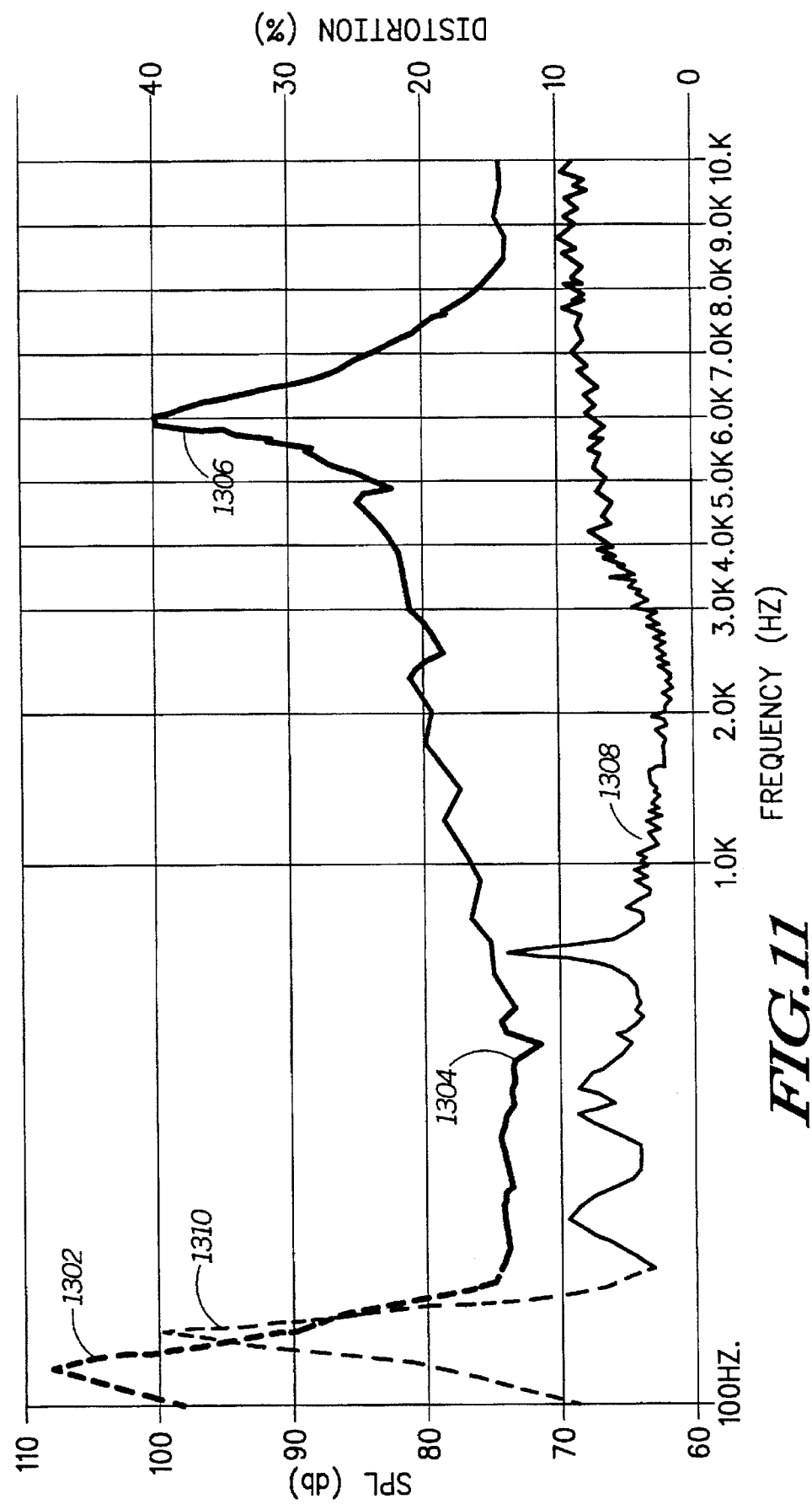
FIG. 11 is a graph showing the frequency response of the dual mode transducer in accordance with the present invention.

The response of the dual mode transducer 600 to the swept sub audible frequency signal is shown in FIG. 11, which is a graph showing the overall frequency response of the dual mode transducer 600. As the dual mode transducer 600 is swept over the sub audible frequency range, a prominent response 1302 is generated at the fundamental resonant frequency of the dual mode transducer 600, imparting significant tactile energy to the housing 1002. As the frequency input is increased, the tactile energy output drops rapidly, as previously described in FIG. 7. A relatively constant audible output 1304 is produced enabling the dual mode transducer 600 to function as an audible transducer over the received voice message frequency range. The dual mode transducer 600 output 1306 again peaks at a frequency determined by the sound board 1014 resonance, which as shown is on the order of 6 kilo-Hertz in the example shown. As can be seen in FIG. 11, the audible distortion 1308 remains relatively constant and low over the majority of the audible, or voice, message frequency range. As would be expected, the audible distortion peaks 1310 significantly at the fundamental resonant frequency of the dual mode transducer 600.

Returning to FIG. 10, in order to control the tactile response of the dual mode transducer 600, a high pass filter 1214 which is part of the processing means 1236 is placed in the received audio path, significantly attenuating those frequencies received within the audio message at the fundamental resonant frequency of the dual mode transducer 600. The filtered audible message signal is coupled to a dual mode driver circuit which amplifies and couples the audible message signal to the dual mode transducer 600.

A microphone 1220, gain adjust circuit 1222 and sidetone adjust circuit 1224 allow the portable transceiver user to deliver an audible message in a manner well known in the art. As with the received audible signal, the output of the sidetone adjust circuit 1224 is coupled to the dual mode transducer 600 through the high pass filter 1214 to prevent unwanted tactile responses by the dual mode transducer 600. The audible message generated by the microphone 1220 is processed through the codec 1210, the adaptive differential pulse code modulator/demodulator 1208, the time division duplexer 1206 and the transmitter portion of the radio frequency transceiver 1204 in a manner well known in the art. A keyboard 1226 is provided to allow entry of the telephone numbers of called parties or to review stored telephone numbers. The telephone number input is processed by the microcontroller 1212 which couples the telephone number information to a display driver 1228 for display on a display 1230, such as a liquid crystal display. A code memory 1232 stores a portable transceiver address and PIN number which are used by the micro controller to enable selectively contacting the portable transceiver 1200 when matching selective call address signals are received, and for enabling the portable transceiver 1200 to communicate with a telepoint base station in a manner well known in the art.

Unlike conventional portable radiotelephone handsets which decode the received ring signals to generate either a preset audible ring or chirp signal or a ramp-up audible ring or chirp signal to generate an audible ring to alert the user of an incoming phone call, the portable transceiver using a dual mode transducer 600 driven by an electronic driver in accordance with the present invention preferably generates a tactile alert. The tactile alert is advantageous in that when generated either for a newly received call, or as an alert for a "call-waiting" call, the alert signal is not intrusive, i.e. does not disrupt other persons in the vicinity of the user, and does not subject the user to a loud audible alert, should the portable transceiver be held to the user's ear during a conversation while a "call waiting" alert is generated.

In an alternate embodiment of the present invention, a paging receiver 1234 can be coupled to the microcontroller to provide an indication of a "call waiting" message. When configured using the paging receiver, the user of the portable radiotelephone handset can be engaged in a telephone conversation 1402, as shown in FIG. 12. During the ongoing telephone conversation 1402, an address 1404 identifying the portable radiotelephone handset, and a corresponding numeric data message 1406 identifying the telephone number of a "call waiting" caller can be received by the paging receiver. The address and data message are handled in a manner well known by one of ordinary skill in the art, generating an alert enable signal 1238 shown in FIG. 10 and a received data signal 1240. The alert enable signal is processed by the microcontroller 1212 which results in generating a ringer enable signal, which is coupled to the swept frequency signal generator 1216 which, as described above, which then generates the swept sub-audible frequency signal 1408. The swept sub-audible frequency signal 1408 is coupled to the dual mode driver even as the ongoing telephone conversation 1402 is in progress, resulting in a tactile alert being generated alerting the user of a "call waiting" call simultaneously with the audio of the telephone conversation being carried on. Because the "call waiting" alert is tactile, control of the amplitude of the alerting signal is not critical, as is required when an audible alert signal is generated. The tactile alert signal has the additional advantage of being simultaneously generated with the ongoing telephone conversation, whereas the audible alert would result in an interruption of the ongoing telephone conversation. Once the telephone conversation is ended, the numeric data delivered by the received data signal can be processed by the microcontroller 1212, enabling the received telephone number to be displayed on the display 1230. Automatic dialing of the received telephone number can be accommodated using the keyboard 1226 in a manner well known in the art.

Figure 13:
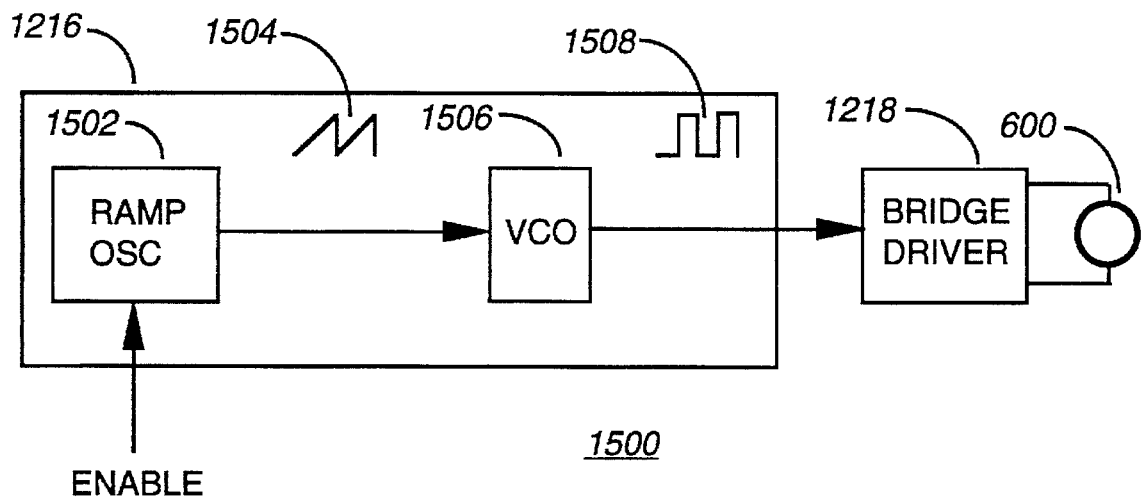
FIG. 13 is an electrical block diagram of an electronic driver for an electromagnetic resonant transducer in accordance with a first embodiment of the present invention.

FIG. 13 is an electrical block diagram of an electronic driver for driving an electromagnetic resonant transducer, such as the dual mode transducer 600, in a tactile alerting system 1500 in accordance with a first embodiment of the present invention. The tactile alerting system 1500 includes a swept frequency signal generator 1216, a bridge driver 1218 which functions as a transducer driver and the dual mode transducer 600 which utilizes a non-linear hardening spring resonant armature system which when driven with a swept frequency input frequency becomes a tactile alerting device as described above. The swept frequency signal generator 1216 includes by way of example a ramp generator 1502 which generates a control voltage 1504 which periodically varies in magnitude over a predetermined period of time and a voltage controlled oscillator 1506. An enable signal input (ENABLE) provide a means for suspending the operation of the ramp generator 1502, which in turn results in suspending the generation of a tactile alert. The output of the ramp generator 1502 is coupled to an input of a voltage controlled oscillator 1506 which generates a swept frequency output signal 1508 which is coupled to an input of the bridge driver 1218 which amplifies the swept frequency output signal to enable driving the dual mode transducer 600. The ramp generator 1502 and the voltage controlled oscillator 1506 can be implemented using any of a number of well known retriggerable ramp generating circuits coupled to an analog voltage controlled oscillator or current controlled oscillator; discrete logic functions, such as a down counter coupled to a modulo timer; or a microcomputer or digital signal processor programmed to generate a periodically varying swept frequency output.

Figure 14:
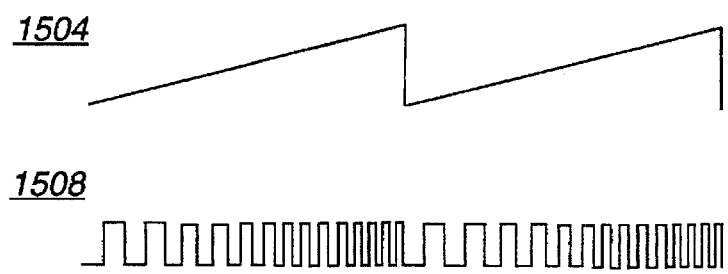
FIG. 14 shows a first set of wave forms generated by the electronic driver of FIG. 13 in accordance with a first aspect of the present invention.

FIG. 14 shows a first set of wave forms which can be generated by the electronic driver of FIG. 13 in accordance with a first aspect of the present invention. As shown in FIG. 14, the control voltage 1504 generated by the ramp generator 1502 periodically varies in amplitude over a predetermined period of time with the amplitude varying substantially linearly in increasing amplitude over the predetermined period of time. In response to the control voltage 1504 being generated, the voltage controlled oscillator 1506 generates a swept frequency output signal which varies continuously in increasing frequency. The voltage controlled oscillator 1506 is designed to generate a frequency output starting below the fundamental mode resonant frequency of the dual mode transducer 600 when the amplitude of the control voltage is low, upto a predetermined frequency above the fundamental mode resonant frequency when the amplitude of the control voltage is high. The predetermined frequency above the fundamental mode resonant frequency is preferably a frequency which is above the frequency of operating state 906 shown in FIG. 7. As described in FIG. 7, the increasing frequency of the swept frequency output signal results in an increasing displacement of the magnetic motional mass of the dual mode transducer 600, which in turn generates an increasing tactile energy output by the dual mode transducer 600. The selection of a predetermined frequency above that of operating state 906 insures that maximum tactile energy is generated by the dual mode transducer 600, and that the tactile energy output is abruptly reduced as the dual mode transducer tactile energy output transitions from operating state 906 to operating state 912, as shown in FIG. 7, prior to the start of the next frequency sweep cycle.

Figure 15:
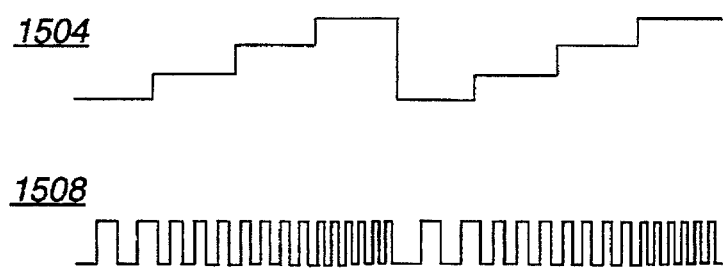
FIG. 15 shows a second set of wave forms generated by the electronic driver of FIG. 13 in accordance with a second aspect of the present invention.

FIG. 15 shows a second set of wave forms generated by the electronic driver of FIG. 13 in accordance with a second aspect of the present invention. As shown in FIG. 15, the control voltage 1504 generated by the ramp generator 1502 periodically varies in amplitude over a predetermined period of time, and the amplitude varies in a sequence of steps of increasing amplitude over the predetermined period of time. In response to the control voltage 1504 being generated, the voltage controlled oscillator 1506 generates a swept frequency output signal which varies in a sequence of time intervals of increasing frequency. The operation of the voltage controlled oscillator 1506 is essentially the same as described above. While only a sequence of four steps are shown in FIG. 15, it will be appreciated that a larger number of steps, such as eight or sixteen can be generated, depending upon how precisely the peak tactile output of the dual mode transducer 600 is to be attained.

Figure 16:
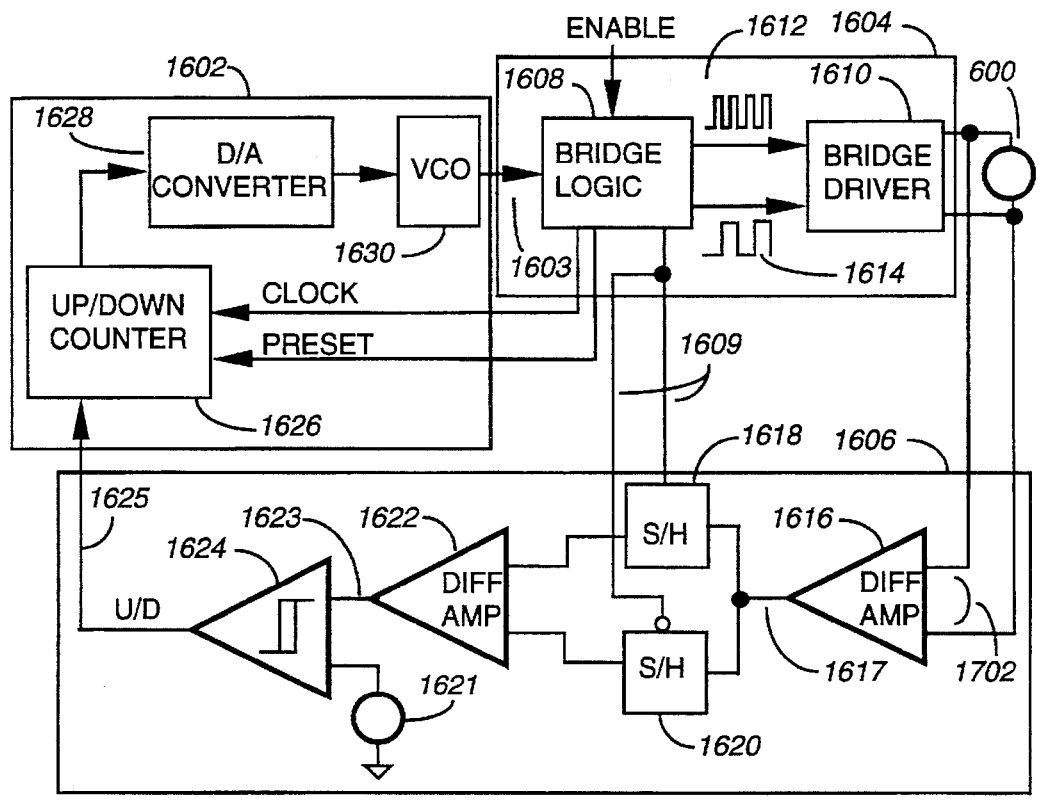
FIG. 16 is an electrical block diagram of an electronic driver for an electromagnetic resonant transducer in accordance with a second embodiment of the present invention.

FIG. 16 is an electrical block diagram of an electronic driver for driving an electromagnetic resonant transducer, such as the dual mode transducer 600 described above, and which is utilized in a tactile alerting system 1600 in accordance with a second embodiment of the present invention. Unlike the tactile alerting system 1500 described above which maximizes the tactile energy generated by the dual mode transducer 600 by utilizing a swept frequency driving signal, the tactile alerting system 1600 advantageously maximizes the level of tactile energy delivered by the dual mode transducer 600. The tactile energy is maximized by sampling the voltage generated by the movement of the magnetic motional mass through the electromagnetic coil 604 during a predetermined time interval during which the bridge driver output is disabled, i.e. the bridge driver output floats, as will be described in detail below.

The tactile alerting system 1600 comprises a tactile alerting device, such as a electromagnetic resonant vibrator, which can be either the dual mode transducer 600 described above which utilizes a non-linear hardening spring resonant armature system which includes a plurality of planar non-linear spring members which are coupled to a magnetic motional mass, and which suspend the magnetic motional mass within an electromagnetic driver, or the linear resonant vibrator system described in respect to FIG. 6 above. The electromagnetic driver is described above in FIG. 5, and shown as the electromagnetic coil 604 which is coupled to the tactile alerting device driver 1604 of FIG. 16. A variable frequency oscillator 1602 generates an output signal 1603 which produces a frequency which is controlled by a frequency control signal 1625 generated by a tactile energy monitor 1606. The tactile energy monitor 1606 maximizes the level of the tactile energy generated by the movement of the magnetic motional mass within the electromagnetic coil 604 by monitoring the voltage generated across the electromagnetic coil 604, as described above, when the bridge driver output is disabled, and generates a frequency control signal which then maximizes the tactile energy delivered by the tactile alerting device.

The outputs of the bridge driver 1610 are coupled to the electromagnetic coil 604 within the dual mode transducer 600 and to inputs of the tactile energy monitor 1606, specifically to inputs to a differential amplifier 1616. The output of the differential amplifier 1616 couples to the input of a first sample and hold register 1618 and also to the input of a second sample and hold register 1620. The differential amplifier 1616, first sample and hold register 1618 and second sample and hold register 1620 form a sampling circuit, or sampling means, for sampling the voltage generated across the electromagnetic coil 604 by the magnetic motional mass, as will be described in detail below. The output of the first sample and hold register 1618 couples to a first input of a differential amplifier 1622, and the output of the second sample and hold register 1620 couples to the second input of the differential amplifier 1622. The differential amplifier 1622 forms a summing means, a circuit which sums the outputs from the first sample and hold register 1618 and the second sample and hold register 1620, producing at the output a magnitude difference signal 1623. The output of the differential amplifier 1622 couples to a first input of a comparator 1624, while the second input of the comparator 1624 couples to a frequency offset reference 1621, which provides a predetermined reference voltage, as will be described below. The comparator 1624 generates a frequency control signal 1625 by comparing the magnitude difference signal 1623 to the signal generated by the frequency offset reference 1621. The frequency control signal 1625 is coupled to the input of the variable frequency oscillator 1602 and controls whether the output signal 1603 generated is to be increased or decreased, as will be described below.

The operation of the tactile alerting system 1600 in accordance with the present invention is best understood by referring to FIGS. 17, 18 and 19. Referring first to FIG. 17, there is shown three wave forms 1612, 1614 and 1702. Wave forms 1612 and 1614 are generated by the bridge logic 1608 and are coupled into the inputs of the bridge driver 1610. Wave form 1612 depicts a disable signal which is generated periodically, and which is a sub multiple of the frequency provided at the output of the variable frequency oscillator 1602, and in particular at the output of the voltage controlled oscillator 1630. Wave form 1614 depicts the frequency of the signal which is used to drive the electromagnetic coil 604 of the dual mode transducer 600, and which is by way of example one-half of the frequency of the disable signal described above. Wave form 1702 depicts the signal present at the terminals of the dual mode transducer 600 of FIGS. 16 and 20.

Referring to wave form 1614, during a first predetermined time interval 1632, the magnetic motional mass is driven in a first direction to produce a first displacement, and during a second predetermined time interval 1634, the driving voltage across the electromagnetic coil 604 is reversed and the magnetic motional mass is driven in a second direction to produce a second displacement opposite the first displacement. Power is only supplied by the bridge driver 1610 to the electromagnetic coil 604 for a portion of first predetermined time interval 1632 and second predetermined time interval 1634, such as during time interval 1636 and time interval 1640, and alternately suspended during time interval 1638 and time interval 1642 during which time the voltage generated across the electromagnetic coil 604 by the magnetic motional mass is measured, as will be described below. Thus, as depicted by wave form 1702, power is supplied to the electromagnetic coil 604 during time interval 1704, 1706, 1710 during time interval 4 and time interval 2, alternately driving the magnetic motional mass in a first direction and then in a second, opposite direction; and suspended during time interval 1 and time interval 3 during which time the energy stored in the magnetic motional mass is determined by measuring the voltage across the electromagnetic coil 604.

Referring further to FIG. 17, operation of the tactile energy monitor 1606 to control the voltage controlled oscillator 1630 frequency is depicted. During time interval 1704 the tactile energy output is low, as will be described below, as the voltage controlled oscillator frequency is too low. During time interval 1706, the voltage controlled oscillator frequency has been increased by the operation of the tactile energy monitor 1606, although somewhat below optimum for the generation of maximum tactile energy. And during time interval 1710, the voltage controlled oscillator frequency has been increased further by the tactile energy monitor 1606, and is now somewhat above optimum for the generation of maximum tactile energy.

Referring to FIG. 18, wave form 1802 depicts a typical wave form which occurs when the output frequency supplied to the dual mode transducer 600 is too high. In the instance shown, the voltage generated across the electromagnetic coil 604 by the magnetic motional mass during time interval 1 is greater than the voltage generated across the electromagnetic coil 604 by the magnetic motional mass which is monitored during time interval 3, and as a result the frequency control signal generated by the tactile energy monitor 1606 would decrease the frequency of the output signal generated by the variable frequency oscillator 1602.

Likewise, wave form 1804 depicts a typical wave form which occurs when the output frequency supplied to the dual mode transducer 600 is too low. In this instance, as shown, the voltage generated across the electromagnetic coil 604 by the magnetic motional mass which is monitored during time interval 1 is less than the voltage generated across the electromagnetic coil 604 by the magnetic motional mass which is monitored during time interval 3, and as a result the frequency control signal generated by the tactile energy monitor 1606 would increase the frequency of the output signal generated by the variable frequency oscillator 1602.

In summary, the tactile energy output is near a maximum when the voltage monitored at time interval 1 is equal to the voltage monitored at time interval 3, or put in somewhat different terms, when the difference in the voltage monitored at time interval 1 and the voltage monitored at time interval 3 is zero. Such a condition occurs at the fundamental resonant frequency of a linear transducer as depicted in FIG. 6, and about operating state 906 as depicted in FIG. 7 for a non-linear transducer.

When the dual mode transducer 600 is being driven at the optimum frequency which maximizes the tactile energy generated by the dual mode transducer 600, such as shown in FIG. 18, the voltage monitored during time interval 1 is substantially the same as the voltage monitored during time interval 3. When this occurs, the frequency control signal illustrated by wave form 1902 in FIG. 19 remains substantially constant, maintaining the frequency of the output signal 1603 generated by the variable frequency oscillator 1602 also at a substantially constant output frequency as illustrated by wave form 1904, even though the control voltage is capable of generating a higher output level 1906 and a higher output frequency as described above. FIG. 19 depicts what is termed a "smart" ramp function which can be generated by the electronic driver in accordance with the present invention, as the frequency control signal is periodically swept.

Returning now to FIG. 16, the variable frequency oscillator 1602 includes an up/down counter 1626, a D/A converter 1628 and the voltage controlled oscillator 1630 (VCO). The output signal 1603 of the voltage controlled oscillator 1630 is coupled to the bridge logic 1608 which divides the output frequency to generate a clock signal which is coupled to the clock input of the up/down counter 1626. The output signal 1603 of the voltage controlled oscillator 1630 is further divided to generate the disable signal 1612 and the output signal 1614, as described above. When the output frequency is too high, the frequency control signal 1625 enables the up/down counter 1626 to count down, which in turn reduces the magnitude of the voltage generated at the output of the D/A converter, thereby reducing the output frequency of the voltage controlled oscillator 1630. Likewise, when the output frequency is too low, the frequency control signal enables the up/down counter 1626 to count up, which in turn increases the magnitude of the voltage generated at the output of the D/A converter, thereby increasing the output frequency of the voltage controlled oscillator 1630. It will be appreciated that the variable frequency oscillator 1602 can also be implemented using discrete digital logic, such as an up/down counter and a modulo timer, as well as can be implemented using a microcomputer or digital signal processor which has been suitably programmed to generate the swept frequency output described above.

The bridge logic 1608 also generates a control signal 1609 which is coupled to the clock inputs of the first sample and hold register 1618 and to the second sample and hold register 1620. The first sample and hold register 1618 and the second sample and hold register 1620 are edge triggered devices, and during a first time interval 1638 shown in FIG. 17, the first sample and hold register 1618 is clocked by the bridge logic 1608 storing the output of the differential amplifier 1616 which depicts the magnitude of the voltage generated across the electromagnetic coil 604 by the magnetic motional mass during time interval 1. Likewise during a second time interval 1642 shown in FIG. 17, the second sample and hold register 1620 is clocked by the bridge logic 1608 storing the output of the differential amplifier 1616 which depicts the magnitude of the voltage generated across the electromagnetic coil 604 by the magnetic motional mass during time interval 3.

As was described above, one of the inputs to the comparator 1624 is the frequency offset reference 1621. The frequency offset reference 1621 establishes a frequency offset which limits the frequency sweep to a frequency below operating state 906. Such operation maximizes the tactile energy, and insures that the dual mode transducer 600 does not inadvertently jump to the lower stable operating state, as described above. When the frequency offset reference 1621 is coupled with a comparator having hysteresis, the frequency control signal 1625 generated by the comparator 1624 is prevented from oscillating due to system noise on the magnitude difference signal 1623 input or on the frequency offset reference 1621 input.

A second input (PRESET) is shown coupled to the up/down counter 1626 which is generated by the bridge logic 1608. When the PRESET signal is utilized, the up/down counter 1626 count is set at a predetermined value, such as at a value below the resonate frequency of the non-linear hardening spring resonant armature system described in FIGS. 1–5 and FIG. 7, thereby enabling the generation of the "smart" ramp signal depicted in FIG. 19. The PRESET signal can also be utilized to set the up/down counter 1626 count to generate the intermediate frequency 816 shown in FIG. 6, after which time the maximum tactile energy generated by the linear resonant vibrator system when constrained, as illustrated in wave form 802, or non-constrained, as illustrated by wave form 814 can be generated by the electronic driver in accordance with the present invention.

It will be appreciated that the tactile energy monitor described above can be implemented using other devices which can monitor the level of tactile energy generated such as with an auxiliary sensing coil, accelerometer or strain gauge.

FIG. 20 is an electrical block diagram of a tactile alerting system 2000 for an electromagnetic transducer and is similar in operation to the tactile alerting system 1600 described in FIG. 16. Consequently, only the differences in operation from that described for FIG. 16 will be described below. Unlike the tactile energy monitor 1606 of FIG. 16, the tactile energy monitor 1606 of FIG. 20 utilizes only a single sample and hold register 1618, which is coupled as described above to the output of the differential amplifier 1616 and to the input of the differential amplifier 1622. The output of the differential amplifier 1616 also couples directly to the second input of differential amplifier 1622. In operation, during the first time interval 1638, as described above, the sample and hold register 1618 is clocked by the bridge logic 1608 storing the output of the differential amplifier 1616 which depicts the magnitude of the tactile energy generated by the magnetic motional mass during time interval 1. During the second time interval 1642, the output of the differential amplifier 1616 which depicts the magnitude of the tactile energy generated by the magnetic motional mass during time interval 3 is then directly compared with the output of sample and hold register 1618, as described above. A latch 1652 is coupled to the output of comparator 1624, and is clocked by the bridge logic 1608 only during the second time interval 3, thereby preventing erroneous changes in the frequency control signal during time interval 1, when identical signals are present at the inputs of differential amplifier 1622.

Figure 21:
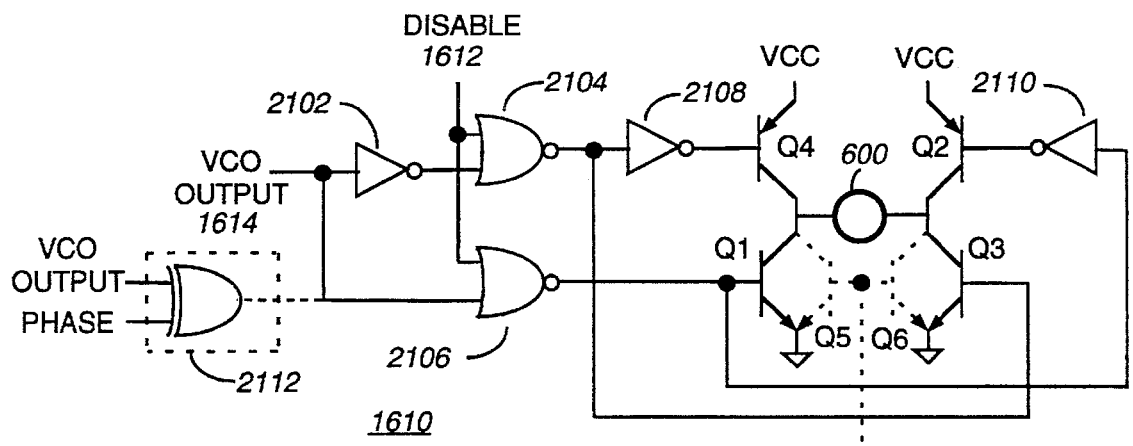
FIG. 21 shows a bridge electronic driver in accordance with the present invention.

FIG. 21 shows the bridge driver 1610 in accordance with the present invention. The bridge driver 1610 includes NPN transistors Q1 and Q3 and PNP transistors Q2 and Q4 arranged in a well known bridge configuration, wherein the collectors of transistors Q1 and Q4 form a first bridge output, and the collectors of transistors Q3 and Q2 form a second bridge output. The emitters of transistors Q2 and Q4 are connected to the supply voltage, VCC, and the emitters of transistors Q1 and Q3 are connected to ground. The base of transistor Q4 is coupled to the output of an INVERTER 2108. The input of INVERTER 2108 is coupled to the output of a NOR gate 2104 and also to the base of transistor Q3. The base of transistor Q2 is coupled to the output of an INVERTER 2110. The input of INVERTER 2110 is coupled to the output of a NOR gate 2106 and also to the base of transistor Q1. A first input of NOR gate 2104 and 2106 are coupled to the disable signal 1612 depicted as wave form 1612 in FIGS. 16 and 20. The second input of NOR gate 2104 is coupled to the output of an INVERTER 2102. The input of the INVERTER 2102 is coupled to the second input of NOR gate 2106 and also to the output signal depicted as wave form 1614 in FIGS. 16 and 20. In operation, the output signal alternately energizes transistors Q1–Q2 and Q3–Q4 thereby generating an alternating driving voltage which drives the magnetic motional mass in a first direction and then in a second, opposite direction. NOR gate 2104 and NOR gate 2106 provide a power control means which disables both halves of the bridge driver, Q1/Q2 and Q3/Q4, floating the bridge driver outputs when the disable signal 1612 is high. Once the bridge driver outputs have been floated, the "fly back" voltage generated across the electromagnetic coil 604 by the magnetic motional mass alternately reversing direction can be monitored, thereby allowing the tactile energy level to be measured, and as a result, enabling the driving frequency to be adjusted to maximize the tactile energy output of the dual mode transducer 600.

In an alternate embodiment of the bridge driver 1610, the collector of NPN transistor Q1 is connected to the collector of an NPN transistor Q5, and the collector of NPN transistor Q3 is connected to an NPN transistor Q6. The emitters of transistor Q5 and Q6 are connected to ground, and the bases of transistors Q5 and Q6 are coupled together and provide a control input, identified as BRAKE. The BRAKE signal advantageously provides a means for dissipating the tactile energy stored within the dual mode transducer 600 by "de-Qing" the electromagnetic coil 604, i.e., by short circuiting both sides of the electromagnetic coil 604 to ground while the DISABLE signal is simultaneously being generated. By "de-Qing" the electromagnetic coil 604, the tactile energy output generated by the dual mode transducer 600 is maximized by bringing the motion of the magnetic motional mass to an abrupt stop.

The braking of the motion of the magnetic motional mass can be enhanced further by first instantaneously reversing the drive signal provided to the electromagnetic coil 604. This is accomplished, as shown in FIG. 21, by connecting the VCO output which normally couples to the input of INVERTER 2102 to a first input of EXCLUSIVE-OR 2112, while the second input of EXCLUSIVE-OR 2112 is coupled to a control signal identified as PHASE. The direction of movement of the magnetic motional mass can be instantaneously reversed by the generation of the PHASE signal during either time interval 2 or time interval 4, followed substantially immediately by the generation of the BRAKE signal during time interval 1 or time interval 3.

FIGS. 22 and 23 are electrical block diagrams of alternate electronic drivers in accordance with the present invention which can be utilized in place of the bridge driver described above. As shown in FIG. 22, the electronic driver comprises a single transistor Q1 driving the dual mode transducer 600 from a single supply, and it will be appreciated that such an electronic driver will not necessarily provide the tactile energy output provided by the bridge driver, because the total excursion of the magnetic motional mass is somewhat reduced when driven from the non-bridge driver output, unless a sufficient voltage and excursion as compared to the bridge driver can be obtained. PNP transistor Q2 is connected across the electromagnetic coil 604, and functions to provide a brake in a manner described above.

As shown in FIG. 23, the electronic driver comprises transistors Q1 and Q2 driving the dual mode transducer 600 when a split power supply arrangement is available. It will be appreciated that the excursion of the magnetic motional mass when driven by the electronic driver of FIG. 23 would be the same as provided by the bridge driver described above, although the complexity of the electronic driver is reduced due to the presence of the split supply voltage. While not shown, an NPN transistor can be connected across the electromagnetic coil 604 of the dual mode transducer 600 to provide the brake function described above.

The tactile alerting system 1600 and tactile alerting system 2000 can be utilized, as described above to maximize the tactile energy output of the dual mode transducer 600 with either the electronic driver of FIG. 22 or the electronic driver of FIG. 23.

In summary, in a first embodiment of the present invention, a tactile alerting system was described above which includes a tactile alerting device which comprises a non-linear, hardening spring resonant armature system which includes a plurality of planar non-linear spring members coupled to a magnetic motional mass and suspended within an electromagnetic driver which generates an electromagnetic field. The tactile alerting system includes a swept frequency signal generator which generates a swept frequency output signal, and a tactile alerting device driver, which has an input coupled to the swept frequency signal generator, and an output coupled to the electromagnetic driver. The electromagnetic driver generates a swept frequency electromagnetic field in response to the swept frequency output signal. Movement of the magnetic motional mass which is generated by the swept frequency electromagnetic field is transformed through the plurality of planar non-linear spring members and the electromagnetic driver into tactile energy thereby generating a tactile alert. The swept frequency output signal sweeps from a frequency below the fundamental mode resonant frequency to a predetermined frequency above the fundamental mode resonant frequency to insure that maximum tactile energy is generated, and that the tactile energy output is abruptly reduced as the tactile energy output transitions from the maximum tactile energy state to a substantially lower tactile energy state prior to the start of the next frequency sweep cycle.

In summary, in a second embodiment of the present invention, a tactile alerting system was also described above which maximizes the tactile energy delivered to a tactile alerting device which comprises a non-linear, hardening spring resonant armature system which includes a plurality of planar non-linear spring members coupled to a magnetic motional mass and suspended within an electromagnetic driver. The electromagnetic driver generates an electromagnetic field in response to an output signal which is generated by a variable frequency oscillator and which varies in response to a frequency control signal. A tactile alerting device driver is coupled to the variable frequency oscillator and to the electromagnetic driver for driving the electromagnetic driver. Movement of the magnetic motional mass which is generated by the electromagnetic field is transformed through the plurality of planar non-linear spring members and the electromagnetic driver into tactile energy which is used to generate a tactile alert. A tactile energy monitor is coupled to the electromagnetic driver and monitors a level of tactile energy generated by the movement of the magnetic motional mass, and generates the frequency control signal which maximizes the tactile energy delivered from the tactile alerting device. A frequency offset signal insures that the tactile energy output is not abruptly reduced as described for the tactile alerting system described above.

In a third embodiment of the present invention, when utilizing the energy monitor to maximize the tactile energy generated by the dual mode transducer, the electronic driver can also be configured to provide a "smart ramp" function, in which case prior to the start of the next frequency sweep the tactile energy output of the dual mode transducer is abruptly reduced by braking the motion of the magnetic motional mass as described above.

We claim:

1. A tactile alerting system, comprising:
   a tactile alerting device comprising a non-linear, hardening spring resonant armature system including a plurality of planar non-linear spring members which are coupled to a magnetic motional mass suspended thereby within an electromagnetic driver for generating an electromagnetic field;

a swept frequency signal generator comprising a ramp generator for generating a control voltage which periodically varies in a sequence of steps of increasing amplitude over a predetermined period of time, and a voltage controlled oscillator, coupled to said ramp generator and responsive to the control voltage generated, for generating a swept frequency output signal; and a tactile alerting device driver, having an input coupled to said swept frequency signal generator, and an output coupled to said electromagnetic driver for generating a swept frequency electromagnetic field in response to the swept frequency output signal, whereby movement of said magnetic motional mass generated by the swept frequency electromagnetic field is transformed through said plurality of planar non-linear spring members and said electromagnetic driver into tactile energy thereby generating a tactile alert.

2. The tactile alerting system of claim 1, wherein said tactile alerting device driver is a bridge driver.

3. The tactile alerting system according to claim 1, wherein the control voltage generated by said ramp generator varies substantially linearly in increasing amplitude over the predetermined period of time.

4. The tactile alerting system according to claim 1, wherein said swept frequency signal generator further comprises means for suspending operation of said ramp generator, thereby suspending generation of the tactile alert.

5. The tactile alerting system according to claim 1, wherein said tactile alerting device has a fundamental mode resonant frequency, and wherein a displacement of said magnetic motional mass increases as the swept frequency output signal increases from a frequency below the fundamental mode resonant frequency to a predetermined frequency above the fundamental mode resonant frequency.

6. The tactile alerting system according to claim 1, wherein the swept frequency output signal provides a frequency output varying typically between 80 Hz and 110 Hz.

7. A tactile alerting system for maximizing tactile energy delivered therefrom, said tactile alerting system comprising:

a tactile alerting device comprising a non-linear, hardening spring resonant armature system including a plurality of planar non-linear spring members which are coupled to a magnetic motional mass suspended thereby within an electromagnetic driver for generating an electromagnetic field;

a variable frequency oscillator, for generating an output signal, said variable frequency oscillator having an input responsive to a frequency control signal for controlling a frequency of the output signal;

a tactile alerting device driver, having an input coupled to said variable frequency oscillator, and an output coupled to said electromagnetic driver for generating an electromagnetic field in response to the frequency of the output signal generated, said tactile alerting device driver further comprising power control means which suspends generation of the electromagnetic field by said electromagnetic driver during a portion of a first predetermined time interval and during a portion of a second predetermined time interval, whereby a movement of said magnetic motional mass is generated by the electromagnetic field and is transformed through said plurality of planar non-linear spring members and said electromagnetic driver into tactile energy thereby generating a tactile alert; and a tactile energy monitor, coupled to said electromagnetic driver, for monitoring a level of tactile energy generated by the movement of said magnetic motional mass during the portion of the first predetermined time interval and during the portion of the second predetermined time interval, and for generating in response thereto the frequency control signal to maximize the tactile energy delivered therefrom.

8. The tactile alerting system according to claim 7, wherein said variable frequency oscillator is a voltage controlled oscillator.

9. The tactile alerting system according to claim 7, wherein the movement of said magnetic motional mass produces a first displacement, and a second displacement opposite the first displacement, and wherein said tactile energy monitor comprises:

sampling means for sampling a first magnitude of a voltage generated by movement of said magnetic motional mass within said electromagnetic driver at the first displacement during the portion of the first predetermined time interval, said sampling means further for sampling a second magnitude of a voltage generated by movement of said magnetic motional mass within said electromagnetic driver at the second displacement during the portion of the second predetermined time interval;

summing means for summing the first magnitude and the second magnitude, and for generating in response thereto a magnitude difference signal; and a comparator for comparing the magnitude difference signal generated with a predetermined reference signal and for generating therefrom the frequency control signal.

10. The tactile alerting system according to claim 9, wherein said sampling means further comprises a first memory for storing the first magnitude of the voltage generated by said magnetic motional mass at the first displacement during the portion of the first predetermined time interval, and a second memory for storing the second magnitude of the voltage generated by said magnetic motional mass at the second displacement during the portion of the second predetermined time interval.

11. The tactile alerting system according to claim 9 wherein the frequency control signal generated increases the frequency of the output signal generated by said variable frequency oscillator when the first magnitude of the voltage generated by said magnetic motional mass at the first displacement during the portion of the first predetermined time interval is less than the second magnitude of the voltage generated by said magnetic motional mass at the second displacement during the portion of the second predetermined time interval.

12. The tactile alerting system according to claim 9 wherein the frequency control signal generated decreases the frequency of the output signal generated by said variable frequency oscillator when the first magnitude of the voltage generated by said magnetic motional mass at the first displacement during the portion of the first predetermined time interval is greater than the second magnitude of the voltage generated by said magnetic motional mass at the second displacement during the portion of the second predetermined time interval.

13. The tactile alerting system according to claim 9, wherein said tactile alerting device has a fundamental mode resonant frequency, and wherein a displacement of said magnetic motional mass increases as the output signal increases from a frequency below the fundamental mode resonant frequency to a predetermined frequency above the fundamental mode resonant frequency.

14. The tactile alerting system according to claim 13, wherein the output signal has a frequency varying typically between 80 Hz and 110 Hz.

15. The tactile alerting system according to claim 7, whereby said electromagnetic driver generates an electromagnetic field moving said magnetic motional mass is a first direction during a first predetermined time interval, and further moves said magnetic motional mass in a second direction during a second predetermined time interval, and wherein said tactile alerting device driver further comprises a control input for generating an electromagnetic field for moving said magnetic motional mass in a second direction during the first predetermined time interval, and further for generating an electromagnetic field for moving said magnetic motional mass in a first direction during the second predetermined time interval.

16. The tactile alerting system according to claim 7, wherein said tactile alerting device driver further comprises means for dissipating the tactile energy generated by the movement of said magnetic motional mass.

\* \* \* \* \*